United States Patent [19]

Parrish

[11] Patent Number: 4,682,390
[45] Date of Patent: Jul. 28, 1987

[54] BUCKLE AND BODY RESTRAINT SYSTEM FOR A VEHICLE

[76] Inventor: Stanley G. Parrish, 10022 SW. Terwilliger Blvd., Portland, Oreg. 97219

[21] Appl. No.: 830,361

[22] Filed: Feb. 18, 1986

Related U.S. Application Data

[63] Continuation-in-part of Ser. No. 736,449, May 21, 1985, abandoned.

[51] Int. Cl.⁴ ............................................. A44B 11/26
[52] U.S. Cl. ........................................ 24/632; 24/636; 24/665; 297/484
[58] Field of Search ................ 24/574, 651, 643, 656, 24/630–632, 636, 639, 665; 297/468, 484

[56] References Cited

U.S. PATENT DOCUMENTS

| | | | |
|---|---|---|---|
| 2,171,496 | 8/1939 | Waite et al. | 24/574 |
| 2,825,112 | 3/1958 | Frider et al. | 24/656 X |
| 2,899,732 | 8/1959 | Cushman | 24/632 |
| 3,639,948 | 2/1972 | Sherman | 24/632 |
| 3,825,979 | 7/1974 | Jakob | 24/574 |
| 4,403,376 | 9/1983 | Palloks | 24/631 |
| 4,457,052 | 7/1984 | Hauber | 24/656 |

FOREIGN PATENT DOCUMENTS

| | | | |
|---|---|---|---|
| 3302301 | 7/1984 | Fed. Rep. of Germany | 24/630 |
| 571760 | 3/1924 | France | 24/631 |
| WO84/01275 | 4/1984 | PCT Int'l Appl. | 24/633 |
| 508243 | 6/1939 | United Kingdom | 24/631 |
| 915168 | 1/1963 | United Kingdom | 24/632 |

Primary Examiner—Kenneth J. Dorner
Assistant Examiner—James R. Brittain

[57] ABSTRACT

A restraint harness attachable to a vehicle lap belt and having a waist strap, shoulder straps and a crotch strap with a looped segment through which the shoulder straps and lap belt passes. A buckle for the harness receives the fittings on each end of the above straps. The buckle includes a latch plate with detents thereon with the plate being both tiltable for individual strap release or depressible for simultaneous release of all straps. The latch plate is centrally supported by a spring. An insert is adjustable to permit the user to determine the degree of pressure required to actuate a latch plate control member.

6 Claims, 9 Drawing Figures

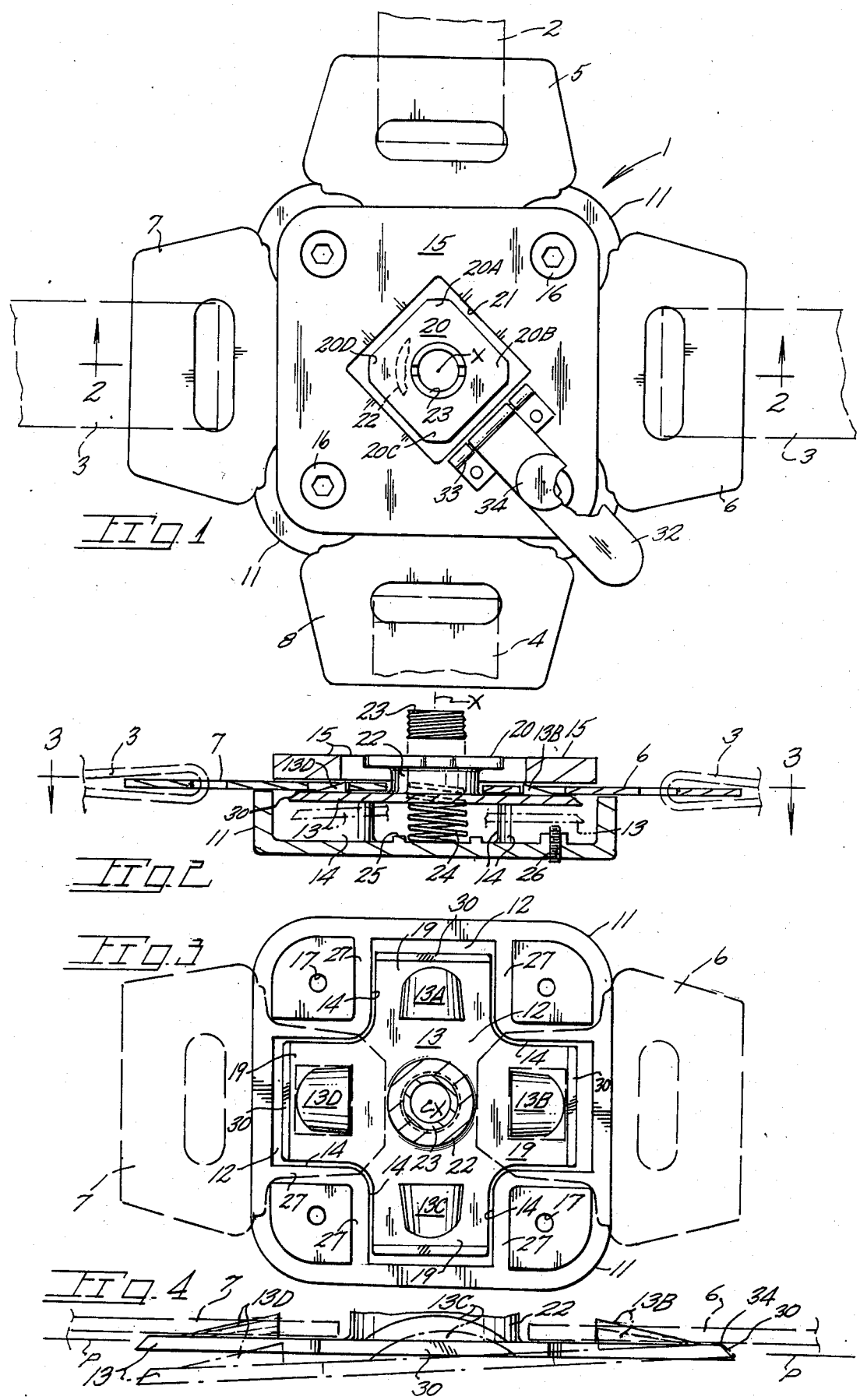

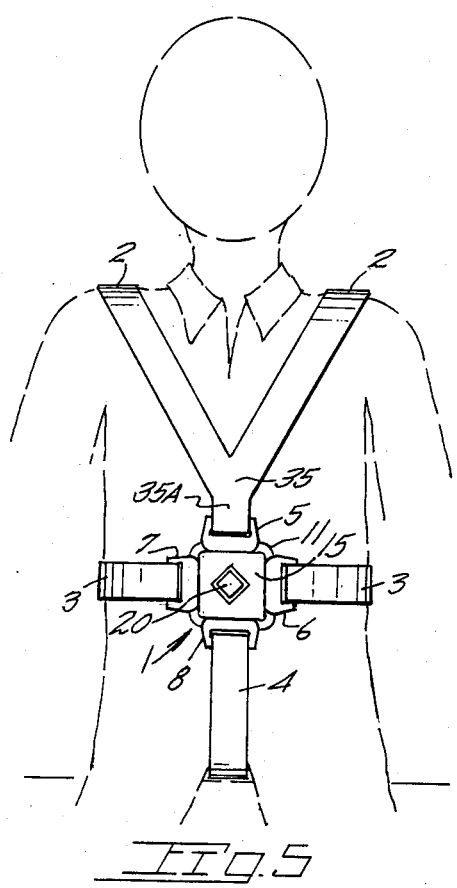
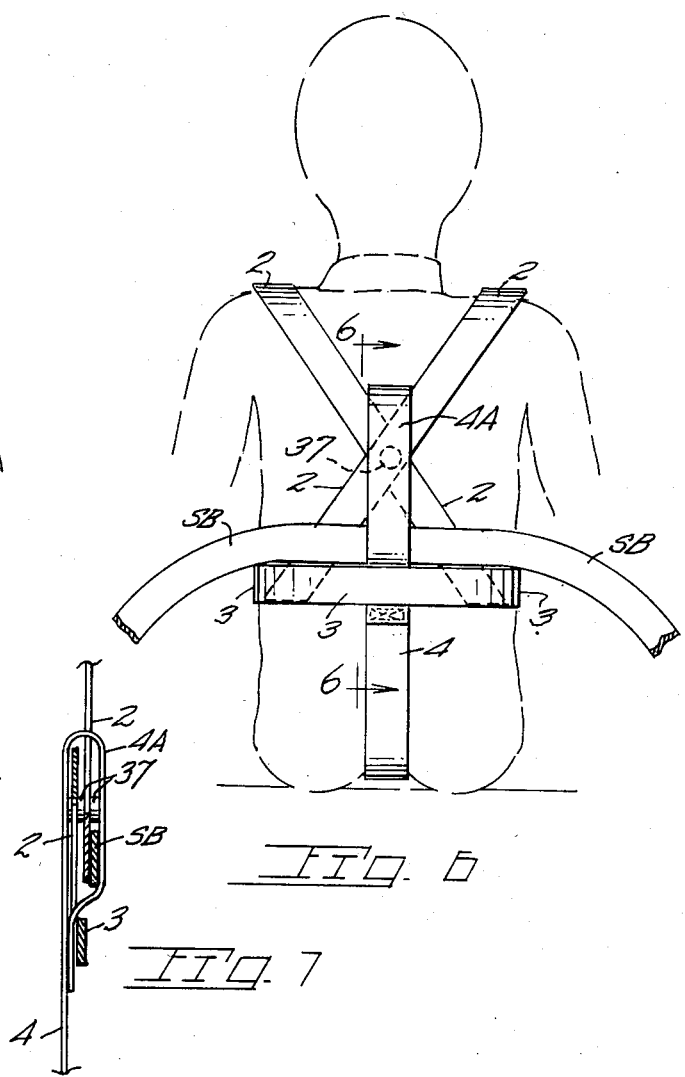
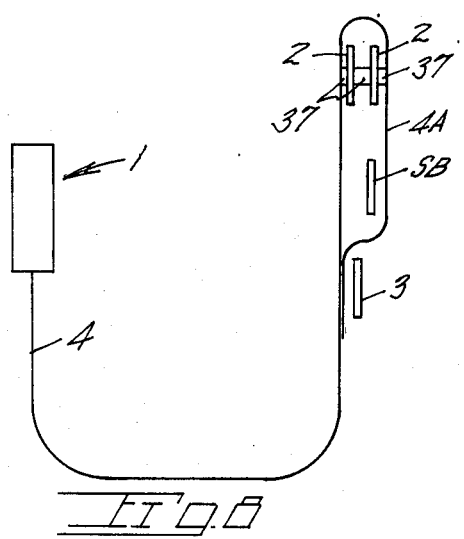
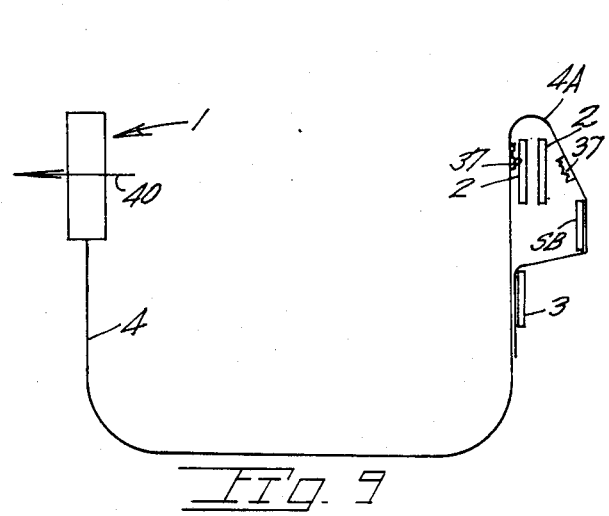

BUCKLE AND BODY RESTRAINT SYSTEM FOR A VEHICLE

BACKGROUND OF THE INVENTION

This application is a continuation-in-part of my earlier filed pending U.S. patent application bearing serial number 06/736,449 filed May 21, 1985, abandoned by the present inventor.

The present invention concerns generally vehicle restraint systems to retain the body in place against impact generated forces.

Considerable inventive effort has been directed toward the development of both buckles and cooperating belts, straps, harnesses, etc., providing retention of body in place against severe loads resulting from a collision yet providing a degree of convenience to the user to encourage use of the system.

Prior art buckle arrangements provide for securement of multiple strap ends or alternatively selective release of certain strap ends. Depending upon the configuration of the associated straps, belts, etc., it may be necessary to release only certain straps while retaining other straps in buckle engagement. In an effort to achieve the foregoing, buckle structures have been highly complex contributing to high manufacturing costs and less than ideal reliability. Further known prior art buckles, for the most part, require a certain degree of familiarity with buckle operation; this being particularly a problem with regard to restraint systems for children.

A further problem encountered by known buckle designs is that they do not permit adjustment of spring tension resulting in the unlatching of strap fittings requiring in some instances a great amount of force regardless of the user's requirements.

In general existing vehicle harnesses, restraint systems, etc., fail to contract about the body during a collision or other sudden deceleration. Other harnesses subject the body, and particularly children, to the risk of expulsion through the harness during an accident.

An additional shortcoming of the prior art restraint systems is that they are not compatible with existing vehicle belts and shoulder harnesses and require some modification of the vehicle for their installation. Such modification renders certain prior art harnesses feasible only if incorporated into the vehicle at time of manufacture.

Other known harnesses do not restrain the body in uniform fashion, but rather subject the upper or the lower torso to severe loads. Another drawback to known restraint systems is that when they include structures such as shells or infant chairs the same take up space within the vehicle when not in use and require tedious attachment to existing belt and harness components of the vehicle. The task of placing a young child or infant within such a safety device and subsequently placing retention components constitutes a time consuming task.

The cost of known safety car seats and molded shells for use by young children and infants is such as to be prohibitive especially to young parents.

SUMMARY OF THE PRESENT INVENTION

The present invention is embodied within a vehicle restraint system including a harness and buckle retained in place by the vehicle seat belt which passes through a portion of the present harness.

The present restraint system receives the vehicle seat belt to locate the latter approximately mid-torso whereby restraint loads exerted on the body by the present harness are applied to the upper and lower torso in a more or less uniform manner.

The present restraint harness includes a waist strap, shoulder straps and a crotch strap, all of which carry end fittings for inserted engagement with a buckle located in a highly accessible position forward of the user's mid-torso. The vehicle seat or lap belt is used to anchor the present harness without modification of the seat belt or fittings associated therewith.

The strap components of the present harness, upon collision, exert inward loads on the torso to confine same against accidental expulsion from the harness. Crossed shoulder straps, a waist strap of the harness both serve to position the vehicle seat belt to elevate same into position approximately at the posterior, mid-torso location. As the torso moves forwardly relative the vehicle seat, the seat belt of the vehicle which centrally engages the harness exerts a uniform cinching action on the harness to tighten the harness waist, shoulder and crotch straps.

The buckle used with the present harness includes a housing having multiple sockets for the insertion of metal fittings on the harness strap ends. A latch plate of the buckle is resiliently supported and capable of being inwardly actuated by finger pressure in both a tipped manner as well as in a uniform depressed manner respectively for single strap release or simultaneous release of all strap end fittings. Operation of the control member of the buckle is self-evident in that actuating fingertip pressure is applied to that area of the control member proximate the particular strap end fitting to be released. The control member and the latch plate are jointly supported by a centrally disposed spring component which permits both tilting and uniform actuation of the latch plate for single or for complete strap release. Strap loads imparted to the buckle are borne by the latch plate to avoid loading of the buckle housing. A lever may be included with the buckle to assist in providing adequate control member actuation force in certain instances. Adjustment means is provided for varying the spring rate of a spring used to support the latch member to enable adapting the buckle to specific uses.

Important objectives of the present invention include the provision of a vehicle restraint system which assures retention of the torso by confining same vertically and horizontally against forces resulting from vehicle impact; the provision of a restraint system utilizing crossed shoulder straps, a waist strap and a crotch strap, all engageable with the vehicle seat belt without alteration of the latter; the provision of a restraint system wherein strap components are held in a desired relationship by disengageable means facilitating convenient use and storage of the harness which permits the straps to separate and assume a different relationship upon vehicle impact; the provision of a restraint system having a buckle permitting both selective release and simultaneous release of strap end fittings for both purposes of convenience as well as harness release in an emergency situation; the provision of a release system having a buckle in which actuation for buckle release may be varied permitting the buckle to be suited to specific uses; the provision of a restraint system wherein a single latch plate is engaged by all strap end fittings to avoid imparting severe loads to the buckle housing; the provision of a restraint system including a buckle having a control member the operation of which is readily apparent to the user; the provision of a restraint system having a buckle with buckle actuation being supplemented by lever means.

BRIEF DESCRIPTION OF THE DRAWINGS

In the accompanying drawings:

FIG. 1 is a front elevational view of a harness buckle with associated harness straps and fittings shown in phantom lines;

FIG. 2 is a vertical sectional view taken along line 2—2 of FIG. 1;

FIG. 3 is a horizontal sectional view taken downwardly along line 3—3 of FIG. 2;

FIG. 4 is a schematic side elevational view of the latch plate;

FIG. 5 is a front elevational view of the harness and buckle in place on a torso shown in phantom lines;

FIG. 6 is a rear elevational view of FIG. 5;

FIG. 7 is a vertical sectional view of the harness taken along line 6—6 of FIG. 6;

FIG. 8 sectional schematic view of the harness in its normal configuration; and

FIG. 9 is a view similar to FIG. 8 but showing harness configuration when restraining a torso.

DETAILED DESCRIPTION OF THE PREFERRED EMBODIMENTS

With continuing attention to the drawings wherein applied reference numerals indicate parts similarly hereinafter identified, the reference numeral 1 indicates generally a harness buckle which secures shoulder straps 2, waist strap 3 and crotch strap 4 having apertured end fittings at 5, 6, 7 and 8 to which the straps are attached as by being looped through the fittings and stitched.

A main housing 11 of the buckle has a central cavity or recess 12 of cruciform shape within which is yieldably mounted a latch plate 13 with extensions or wings. Each wing has a detent 13A, 13B, 13C and 13D. The cruciform recess 12 is defined by interior housing walls as at 14 which confine latch plate 13 against lateral movement. A cover plate 15 is mounted on housing 11 by means of screws 16, the heads of which are recessed within said cover plate. Bores 17 are internally threaded to receive screws 16. Latch plate wings are at 9.

Centrally integral with latch plate 13 is a movable control member 20 located within an opening 21 in the cover plate. Said control member includes an internally threaded collar 22 which receives an adjustable threaded insert 23. Said insert is positionable into collar 22 to bias a helical spring 24 in an adjustable manner. The lowermost end of spring 24 is confined by an annulus 25.

From the foregoing it will be apparent that centrally applied pressure on control number 20 will cause uniform displacement of same along a central member axis X. Similarly, pressure applied to any one of the four extremities 20A, 20B, 20C or 20D of control member 20 will result in latch plate 13 being tipped or inclined relative to a plane P (FIG. 4) common to the plate when at its normal position of rest.

The main housing 11 may be provided with an adjustable limit stop 26 shown as a set screw located below a wing of the latch plate to restrict downward movement of the wing when it is desired to attach the buckle in a more or less permanent manner to a specific strap end fitting. Such attachment assures that the buckle will at all times be attached to at least one strap depending on the relationship of the buckle to the strap ends. The limit stop 26 permits rocking motion of the latch plate to the extent the other strap fittings (per the example shown) 5, 7 and 8 are released by restricted latch movement while detent 13B cannot be depressed out of engagement with end fitting 6 by reason of limit stop 26. The buckle may be returned to its dual mode of operation i.e., sequential release of the fittings or simultaneous total release of the fittings by retraction of set screw 26.

With reference to FIG. 3, guideways as at 27 serve to slidably support the lower side margins of each strap end fitting during insertion and removal of the fittings. To facilitate such insertion the outermost edge of each latch plate wing is bevelled at its outer edge as at 30. The upper surface of each strap end fitting, during its insertion and removal, slidably engages the underside of housing cover plate 15. To assure a buckle releasing capability for all users, regardless of buckle carried loads, an emergency release lever 32 is provided which is swingably mounted by means of a hinge 33 in place on the cover plate. A raised button 34 on lever 32 may be swung about the hinge axis into contact with control member 20 whereupon further displacement of lever 32 toward the control member depresses the latter for disengagement of the detents from the latch plate. The lever release above described may be utilized when threaded insert has compressed spring 24 to the extent a substantial amount of force is required to depress control member and latch plate or after an accident when the strap end fittings are in heavily biased engagement with the latch plate detents, as for example, when supporting a suspended body after a collision.

During normal use of the buckle when it is desired to release one end waist strap 3 and its end fitting 8 from the buckle, fingertip pressure will be applied to area 20D of the control member causing detent 13D to be displaced out of the end fitting opening as viewed in FIG. 4 while the detents 13A, 13B and 13C remain in at least partial, edge engagement with strap end fittings 5, 6 and 8. During such tipping of the latch plate the axis of rotation will be a line contact at 34 which will be in contact with the underside of belt fitting 6.

HARNESS

FIGS. 5, 6 and 7 disclose details of a harness shown used with the present buckle to provide a vehicle passenger restraint system. While the figure shown in phantom lines within the harness is that of a child, it will be understood that such a harness is equally adaptable for adult use.

The harness includes the earlier noted shoulder straps 2, waist strap 3 and crotch strap 4 with shoulder straos joined in Y-fashion at 35 prior to a segment 35A being looped through an opening in the end fitting 5. Similarly the ends of waist strap 3 pass through slot shaped openings in end fittings 6 and 7 while crotch strap 4 passes through a like opening in end fitting 8. With attention to FIG. 6, the shoulder straps 2 cross and thence terminate downwardly in stitched attachment to waist strap 3. The rearward end of crotch strap 4 terminates in a loop 4A through which pass in crossed fashion the shoulder straps and a vehicle seat belt at SB.

To retain the straps in a configuration facilitating convenient installation of the harness on a torso, it has been found desirable to apply fastening means at 37 which may be small quantities of a fracturable adhesive which served to couple the shoulder straps to crotch strap loop 4A and to one another. The shoulder straps are accordingly held in a diverging relationship to facilitate easy recognition and grasping. Obviously the fastening means may be otherwise embodied e.g., stitching with low strength material, releasable clamping means; a fracturable or bendable fastener element. The adhesive is preferred for the reason it does not appreciably add to strap section and may be reapplied by the user if necessary.

With reference to FIGS. 8 and 9, it will be seen that during sudden deceleration, the crotch strap 4 and buckle will be advanced to the left as indicated by the arrow at 40 to cause loop 4A to be drawn downwardly to exert a downward influence on shoulder straps 2 while the vehicle seat belt SB will retain waist strap 3 against forward displacement. Accordingly, the shoulder straps and waist belt and crotch strap 3 will all be tightened about the torso to prevent escape thereof from the harness.

While I have shown but one embodiment of the invention, it will be apparent to those skilled in the art that the invention mav be embodied still otherwise without departing from the spirit and scope of the invention.

Having thus described the invention, what is desired to be secured in a Letters Patent is:

1. A buckle within which strap end fittings are releasably secured, said buckle comprising, a housing including a cover plate, said housing having interior walls defining a cavity of cruciform shape closed by said cover plate, said housing defining openings into which said strap end fittings are inserted, said cover plate having a central opening, and latch means in said cavity and including a latch plate with multiple wings each wing having a detent thereon, a resilient member centrally disposed within said cavity and biasing said latch plate to a latching position whereat the strap end fittings are engaged and retained by said detents, a control member on said latch plate having an upright axis and multiple extremities located in a recessed manner within said central opening of the cover plate, said central opening of a size permitting inclination of the control member relative its axis and axial displacement of the control member along its axis to disengage one or more detent from their respective strap end fittings, said latch plate supported in a rockable and in a slidable manner in said cavity by said resilient member with said interior housing walls confining the plate wings against lateral displacement whereby upon motion being imparted to the latch plate in an asymmetrical manner by fingertip pressure on one of said extremities one detent is disengaged from a strap end fitting or alternatively upon axial displacement of the latch plate by fingertip pressure at the center of said control member all detents are simultaneously released from fitting engagement.

2. The buckle claimed in claim 1 wherein said resilient member, said latch plate and said control member are in axial alignment with one another, said resilient member being a helical spring permitting tipping of the latch plate relative said housing to displace a latch plate detent out of engagement with a strap end fitting, said housing including an annulus confining one end of said spring in place in said housing.

3. The buckle claimed in claim 2 wherein said control member includes an insert, said insert axially positionable to bias said helical spring to vary the rate of same and hence the force required to actuate the control member.

4. The buckle claimed in claim 1 additionally including a limit stop adjustably mounted in said housing subjacent one of said wings to limit travel of said one of said wings to prevent disengagement of the detent thereon from one of said strap end fittings.

5. The buckle claimed in claim 1 additionally including lever means on said cover plate engageable with said control member for axial displacement of same.

6. The buckle claimed in claim 1 wherein said interior walls terminate upwardly in guidways for said strap end fittings.

* * * * *